(12) United States Patent
Chen et al.

(10) Patent No.: US 8,564,574 B2
(45) Date of Patent: Oct. 22, 2013

(54) INPUT APPARATUS WITH MULTI-MODE SWITCHING FUNCTION

(75) Inventors: Jiann-Jou Chen, Taipei (TW); Chueh-Pin Ko, Taipei (TW)

(73) Assignee: Acer Incorporated, New Taipei (TW)

( * ) Notice: Subject to any disclaimer, the term of this patent is extended or adjusted under 35 U.S.C. 154(b) by 947 days.

(21) Appl. No.: 12/150,590

(22) Filed: Apr. 29, 2008

(65) Prior Publication Data

US 2009/0073144 A1 Mar. 19, 2009

(30) Foreign Application Priority Data

Sep. 18, 2007 (TW) ................................ 96134764 A
Sep. 29, 2007 (TW) ................................ 96136609 A

(51) Int. Cl.
*G06F 3/033* (2013.01)

(52) U.S. Cl.
USPC ............ 345/179; 345/157; 345/173; 455/418

(58) Field of Classification Search
USPC ................................... 345/156–179; 455/418
See application file for complete search history.

(56) References Cited

U.S. PATENT DOCUMENTS

| | | | |
|---|---|---|---|
| 8,089,473 B2 * | 1/2012 | Koottungal | 345/173 |
| 2001/0055004 A1 * | 12/2001 | Gerpheide et al. | 345/173 |
| 2004/0136083 A1 * | 7/2004 | Wang et al. | 359/642 |
| 2005/0046621 A1 * | 3/2005 | Kaikuranta | 345/173 |
| 2006/0109263 A1 * | 5/2006 | Wang et al. | 345/179 |
| 2006/0111093 A1 * | 5/2006 | Shim et al. | 455/418 |
| 2007/0002016 A1 * | 1/2007 | Cho et al. | 345/157 |

FOREIGN PATENT DOCUMENTS

| | | |
|---|---|---|
| DE | 10065621 | 7/2002 |
| JP | 5-313810 | 11/1993 |
| JP | 5313810 A * | 11/1993 |
| JP | 7-20983 | 1/1995 |
| JP | 7020983 A * | 1/1995 |
| JP | 2004-164609 | 6/2004 |

OTHER PUBLICATIONS

"Data Interpretation Techniques for a Pen-Based Computer", IBM Technical Disclosure Bulletin, International Business Machine Corp. (Thornwood), US, vol. 38, No. 9, Sep. 1, 1995, p. 461, XP000540328 ISSN: 0018-8689.
"Search Report of Europe Counterpart Application", issued on Jun. 30, 2010, p. 1-p. 8, in which the listed reference was cited.
"Office Action of Japan Counterpart Application", issued on Dec. 21, 2011, p. 1-p. 3, in which the listed references were cited.

* cited by examiner

*Primary Examiner* — Amare Mengistu
*Assistant Examiner* — Jennifer Zubajlo
(74) *Attorney, Agent, or Firm* — Jianq Chyun IP Office

(57) ABSTRACT

An input apparatus with a multi-mode switching function is disclosed. In one embodiment, the input apparatus includes a body, an arc surface touching module and a control module. The arc surface touching module is arranged on surface of the body, and is used to input two-dimensional position data. The control module switches the input mode of said input apparatus based on the two-dimensional position data, and generates a control signal based on switched input mode and the two-dimensional position data. In another embodiment, upon transforming the two-dimensional position data into the three-dimensional position data based on the geometric characteristics of the body, the control module of the input apparatus switches the input mode of the apparatus based on the three-dimensional position data and generates a control signal in accordance with the three-dimensional position data.

20 Claims, 21 Drawing Sheets

INPUT APPARATUS WITH MULTI-MODE SWITCHING FUNCTION

FIELD

The exemplary embodiment(s) of the present invention relates to a field of electronic interface device. More specifically, the exemplary embodiment(s) of the present invention relates to an input apparatus based on two-dimensional position data.

BACKGROUND

The conventional electronic apparatus are mostly equipped with one or more typical plane input apparatus, such as a keyboard, a hand writing pad, a plane touching panel, or an input apparatus requiring an operational plane, such as a mouse or a trackball. Among the smaller handheld electronic apparatus, however, space is often inadequate for users to operate along with the conventional plane input apparatus as described above. With electronic devices, such as PDA (personal digital assistant) and cellular phones becoming more powerful and more compact, machine-user interface is always a challenge. A conventional solution is to provide touch panels through viewable screen such as touch pads, e-books, or e-papers.

A problem associated with a conventional plane input device or a typical touch pad is that the user's hand and fingers obscure user's ability to see the screen when the user tries to touch the pad. For example, selecting text using a finger over a portable screen can be cumbersome. Also, human hands are capable of moving in a three-dimensional space, while a conventional human-machine interface device is typically only one-dimensional.

SUMMARY

An input apparatus with multi-mode switching function is disclosed. The input apparatus with multi-mode switching function includes a body, an arc surface touching module and a control module. The arc surface touching module is arranged on the surface of the body for inputting a two-dimensional position data. The control module is operable to switch the input mode of the input apparatus based on the two-dimensional position data, and generates a control signal based on switched input mode and the two-dimensional position data. In one embodiment, the control module is further operable to transform the two-dimensional position data into three-dimensional position data based on the geometric characteristics of the body, and switch the input mode of the input apparatus based on three-dimensional position data, and then generate a control signal based on the switched input mode and the three-dimensional position data.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of a method, system and apparatus for providing a user interface device having multi-mode switching function.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1A:
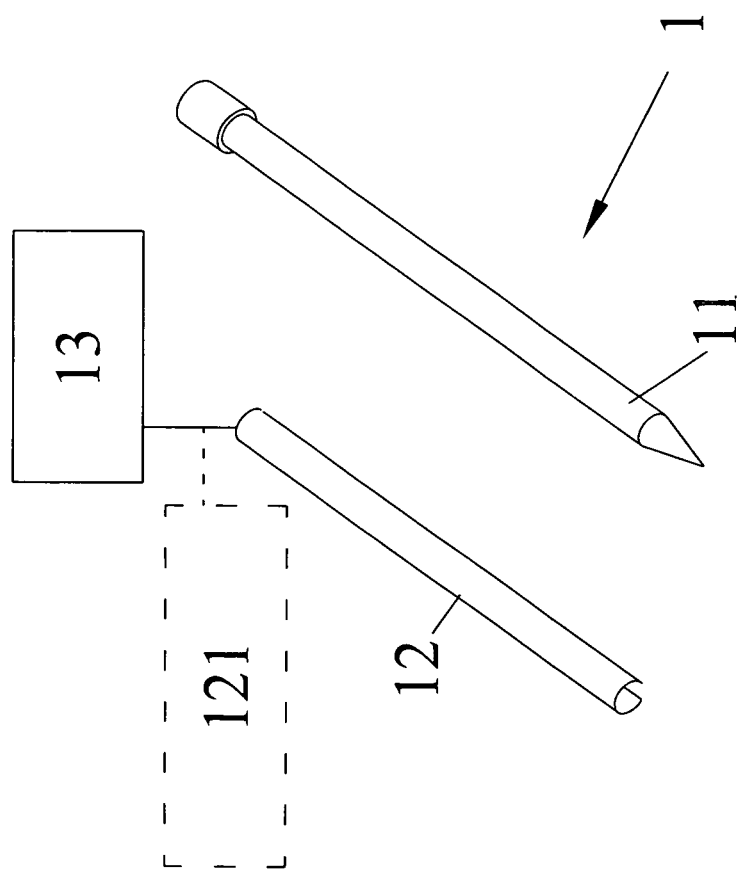
FIG. 1A illustrates a schematic diagram of an input apparatus with multi-mode switching function in accordance with one embodiment of the present invention.
Figure 1B:
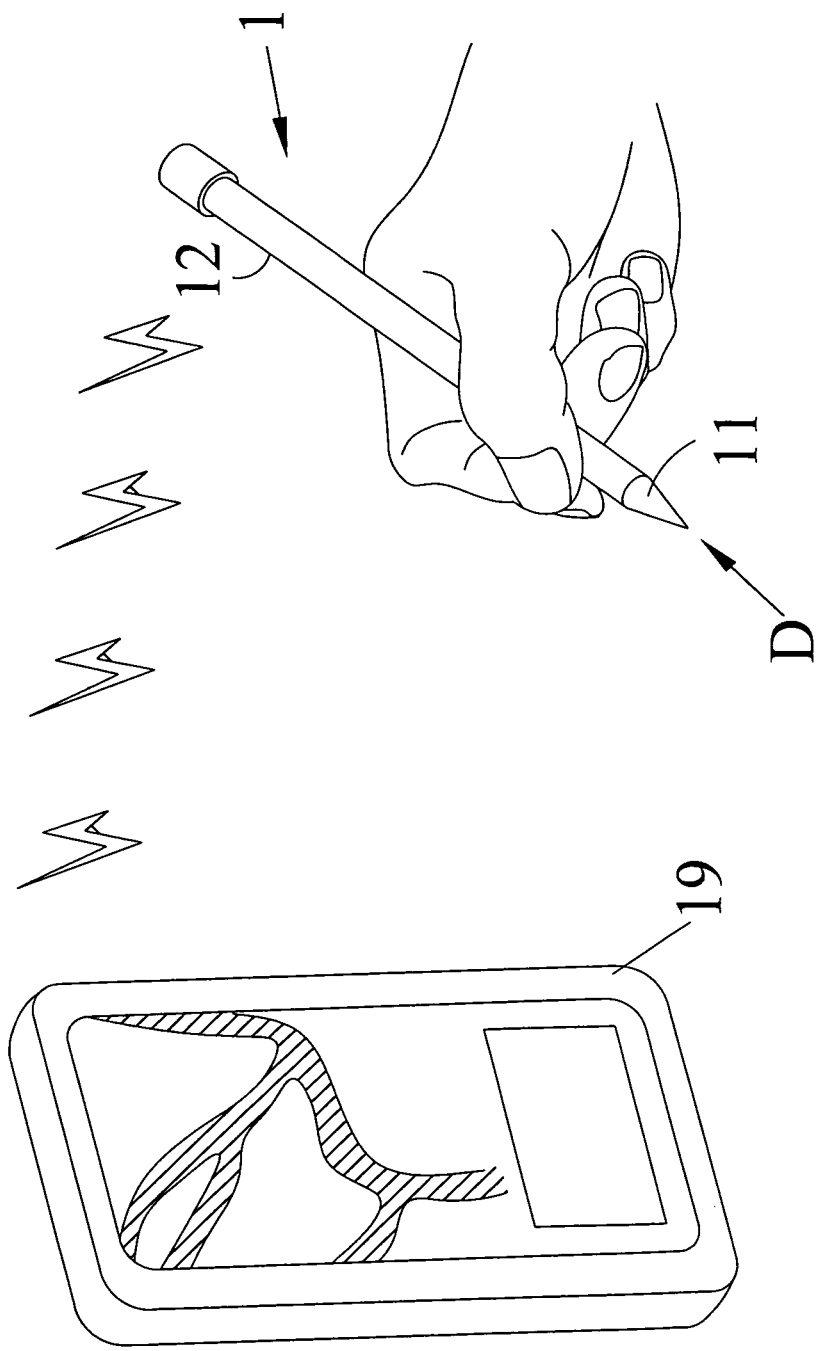
FIG. 1B illustrates a system using an input apparatus with multi-mode switching function in accordance with one embodiment of the present invention.

FIGS. 1A and 1B illustrate an input apparatus 1 with multi-mode function in accordance with one embodiment of the present invention. The input apparatus 1 includes a body 11, an arc surface touching module 12, and a control module 13. Alternatively, the input apparatus 1 is also known as the columnar input device 1. The terms "the input apparatus" and "the columnar input device" can be used interchangeably hereinafter. Also, the arc surface touching module 12 is also known as the cambered touch control module. The terms "the arc surface touching module" and "the cambered touch control module" can be used interchangeably hereinafter. It should be noted that the underlying concept of the exemplary embodiment(s) of the present invention would not change if one or more blocks (circuit or elements) were added to or removed from FIG. 1A-C.

In this embodiment, the body 11 is a pipe-shaped object with cylindrical surface, wherein the body 11 can be a cone, a sphere or any geometric object with arc surfaces. The arc surface touching module 12 is arranged on and/or covered over the surface of the body 11 for detecting and/or inputting a two-dimensional position data 121. The arc surface touching module 12, in one embodiment, is a flexible touching panel. The control module 13 switches the input mode of the input apparatus 1 based on the two-dimensional position data 121. The two-dimensional position data 121, in one embodiment, includes information relating to positions touched or detected on the arc surface touching module 12 by a hand. In addition, position data 121 may further include movement data, which indicates the touched object moving along the arc surface touching module 12.

During an operation, when a user holds the input apparatus 1 with different holding patterns or positions, such as upright hold, reverse hold, upright grasp, reverse grasp, two-handed hold, brush hold, etc., the arc surface touching module 12 receives a combination of different two-dimensional position data in response to the holding patterns. The control module 13 is capable of distinguishing one of the holding patterns or positions of the input apparatus 1. For example, the control module 13 is capable of identifying holding patterns based on the relative relationship of these two-dimensional position data, and switching the input apparatus 1 into the input mode in accordance with the holding pattern.

The input mode can be one of the drawing mode, browsing mode, editing mode, multimedia broadcasting mode, keyboard mode, or the like. Various corresponding control signals are generated for different input modes. For example, control signals for previous page, next page and moving cursor may be generated under browsing mode. Alternatively, control signals for broadcasting, pause, stop, forward, and reverse may be generated under multimedia broadcasting mode.

The control module 13 is operable to generate the control signals to control an electronic device 19 as shown in FIG. 1B, and the combination of the input apparatus 1 and electronic device 19 has several means as the following:

(i) the input apparatus 1 is arranged fixedly on the electronic device;
(ii) the input apparatus 1 is an independent device which can be separated from the electronic device 19, and the input apparatus 1 further includes a signal transmission module for transmitting a control signal via wireless connections to the electronic device 19;
(iii) the control module 13 of the input apparatus 1 is arranged on the electronic device 19, and the body 11 and arc surface touching module 12 of the input apparatus 1 are integrated in an independent device, which can be separated from the electronic device 19. The input apparatus 1 further includes a signal transmission module for transmitting a two-dimensional position data 121 to control module 13, and then the module generates control signals and transmits the control signals to the electronic device 19.

Figure 1C:
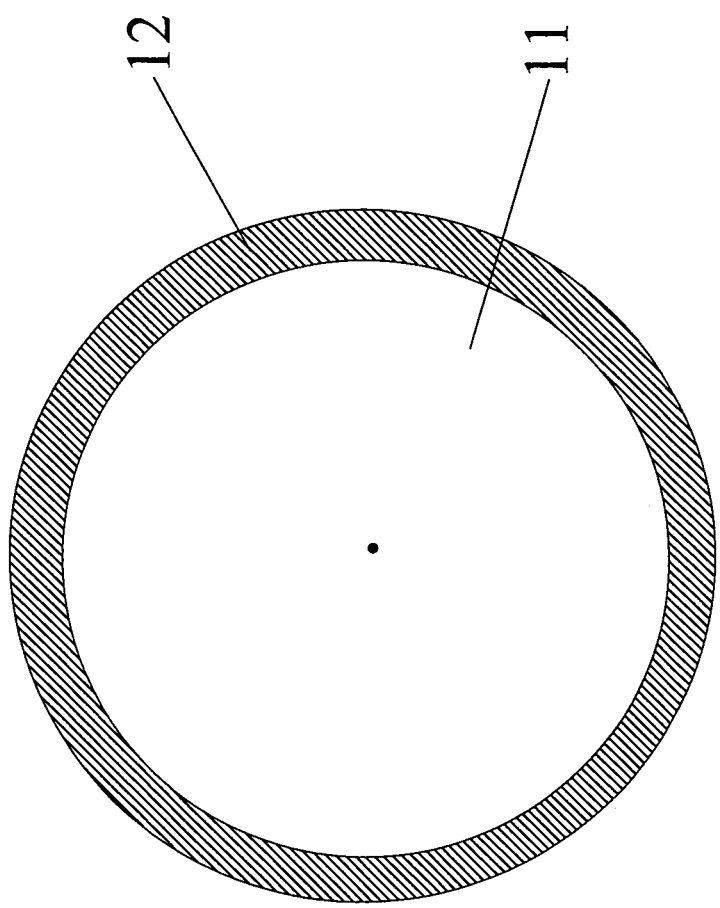
FIG. 1C illustrates a front view of the input apparatus with multi-mode switching function in accordance with one embodiment of the present invention.

FIG. 1C illustrates a front view of the columnar input device, wherein the front view is also indicated by letter D as shown in FIG. 1B. As the input apparatus 1, the columnar input device 1 includes a columnar body 11, a cambered touch control module 12, and a signal transmission module (not shown in FIG. 1B). The columnar body 11 is preferably in a bar, cylindrical or pen-like shape. The cambered touch control module 12 is installed on the columnar body 11. The cambered touch control module 12 is used for sensing a two-dimensional data, and subsequently, transmits the data based on the two-dimensional data to an electronic apparatus 19 through the signal transmission module. The transmission signal is about a position of the cambered touch control module 12, or a displacement of the cambered touch control module 12 made by a user.

An advantage of employing the input apparatus is to increase operational convenience and performance of a user interface device.

Another advantage of using the input apparatus with multi-mode switching function is to fit the input apparatus with the hand anatomy, whereby it allows a user to operate with the input apparatus more comfortably.

In yet another advantage of using the input apparatus is that the input apparatus can switch between multiple input modes, whereby it enhances the efficiency of data input.

Referring back to FIG. 2B, a user holds the columnar input device 1 by one hand, and touches the cambered touch control module 12 to control the electronic apparatus 19, wherein the controls include scrolling, paging up/down, marking a digital content, and the like. The columnar input device 1, in one embodiment, can be stored into the electronic apparatus 19 conveniently, and thus the number of operating keys of the electronic apparatus 19 can be minimized and the area of the screen can be increased.

The columnar input device 1, in one embodiment, includes at least one sensor for detecting a physical quantity of the columnar input device 1, and the sensor preferably includes an acceleration sensor, a gravity sensor, a gyroscope or a digital compass for detecting an acceleration, an inclination angle, a rotation angle or a facing direction of the columnar input device 1. In addition, a signal based on the two-dimensional data or a physical quantity detected by a sensor can be used for issuing an operation instruction through an instruction identification module, which allows a user to use more complicated and diversified operating methods. The instruction identification module can be installed either in the columnar body 11 or in the electronic apparatus 19.

Figure 2A:
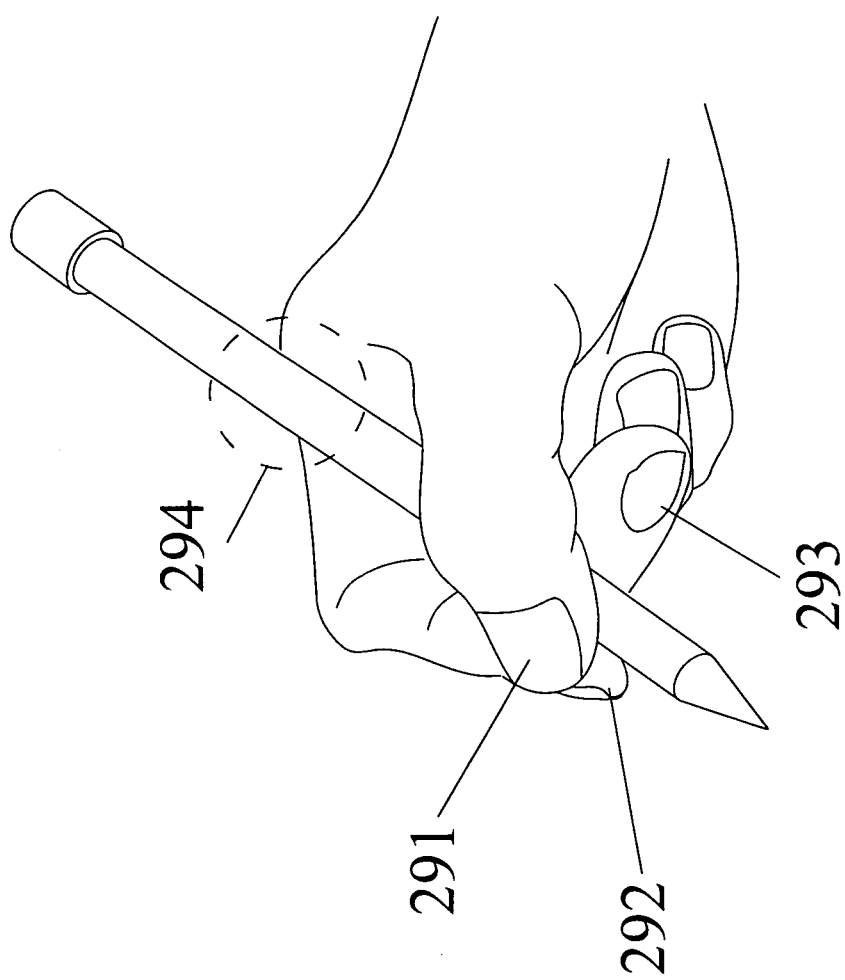
FIG. 2A illustrates a diagram of input mode in accordance with one embodiment of the present invention.
Figure 2B:
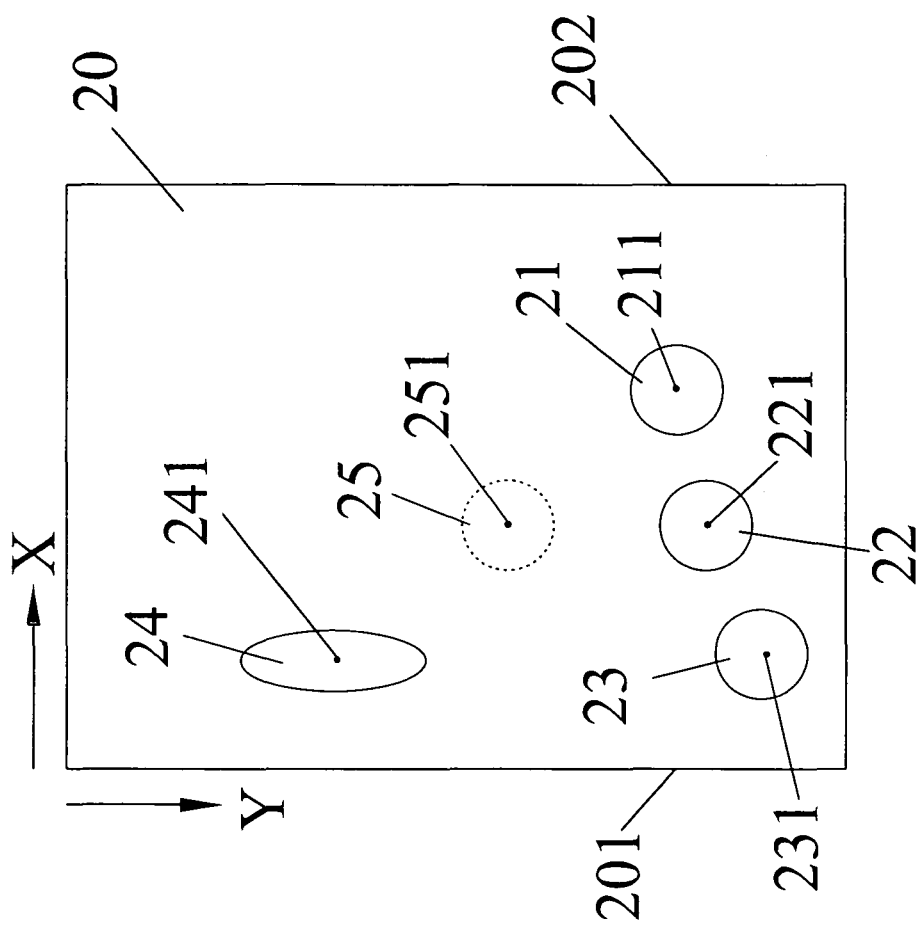
FIGS. 2B-2E are block diagrams illustrating combinations of different two-dimensional position data received by an arc surface touching module in accordance with one embodiment of the present invention.
Figure 2C:
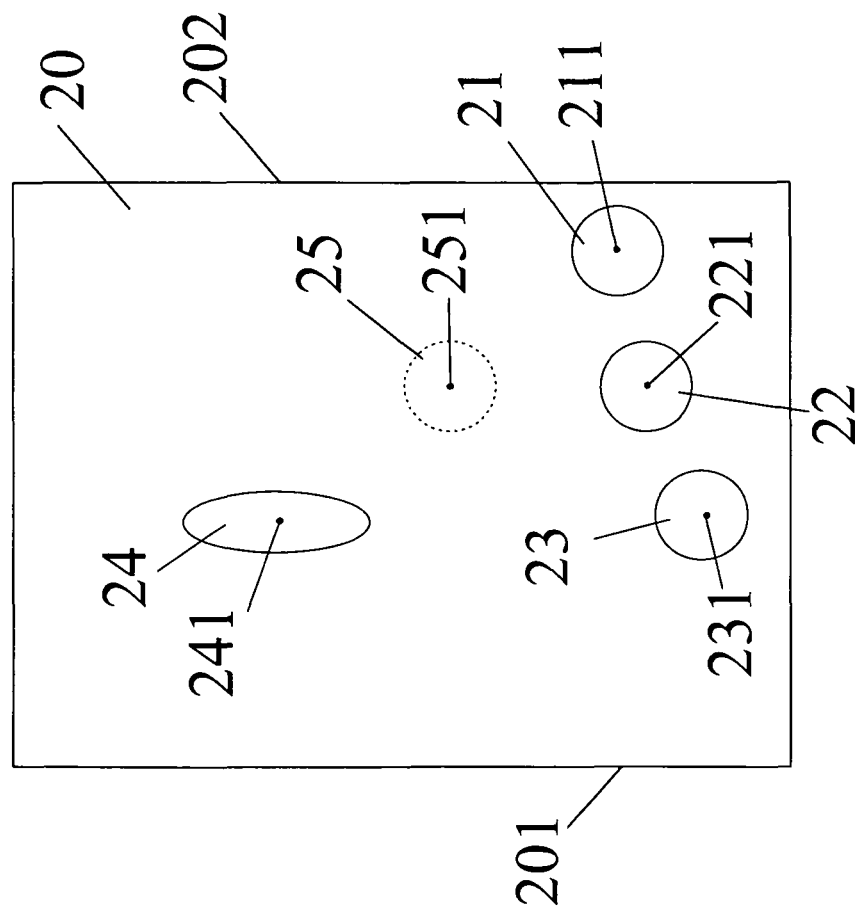
Figure 2D:
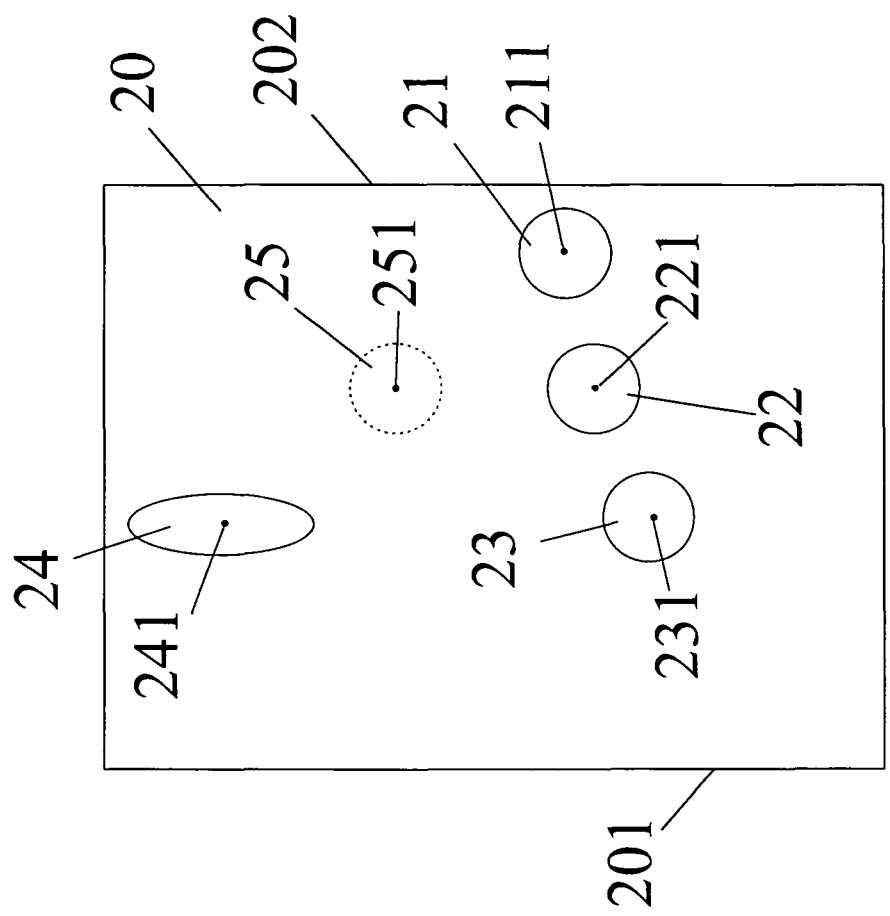
Figure 2E:
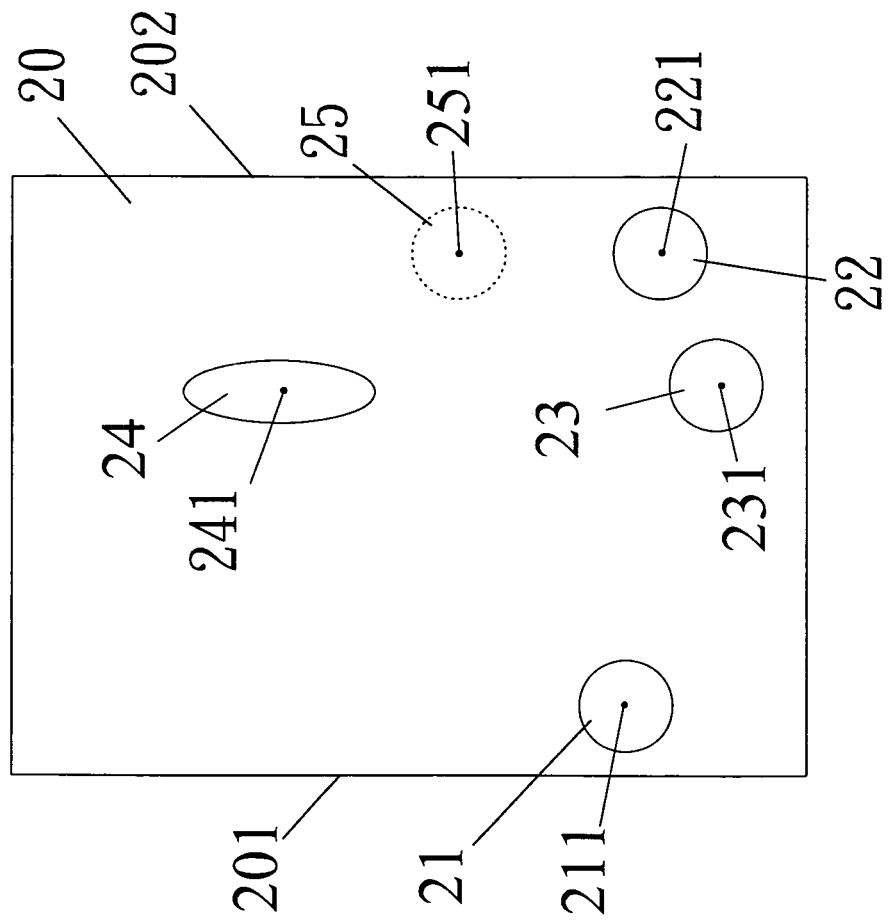

FIGS. 2A and 2E illustrate combinations of assorted two-dimensional position data detected by the arc surface touching module in accordance with one embodiment of the present invention. It is noted that a plane 20 represents the touching position of the arc surface touching module shown in FIG. 2B. The top left corner of the plane 20 is the origin of the two-dimensional coordinates, wherein the rightward arrow points to the positive direction of an X-axis and the downward arrow points to the positive direction of a Y-axis for a two-dimensional coordinates. It should be noted that the bottom right corner of the plane 20 is the maximum coordinate position. In this embodiment, plane 20 is arranged in a cylindrical surface of the body 1, wherein the cut edge of 201 and 202 are connected and the top of the plane 20 is arranged at the rear end of the input apparatus 1. The bottom of the plane 20 is arranged at the front end of the input apparatus 1.

FIG. 2A illustrates a user who holds the front end of the input apparatus 1. The user's thumb 291 touches the area 21 of the plane 20 and the index finger 292 touches the area 22 of the plane 20. The middle finger 293 touches the area 23 of the plane 20, and a part of the hand 294 between the thumb 291 and the index finger 292 touch the area 24 of plane 20. The arc surface touching module 12, in one embodiment, detects and inputs a two-dimensional position 211, a two-dimensional position 221, a two-dimensional position 231, and a two-dimensional position 241. As shown in FIG. 2B, the centric point is used as the position of this area, but is not limited thereto. It should be noted that a person in the art can devise relative relationship of the touching area and the position thereof if necessary.

To increase the operational convenience of the input apparatus 1, user can operate without distinguishing the origin of the arc surface control module 12. The control module 13 is configured to use relative movements of the plurality of touching areas to distinguish the user's holding pattern of the input apparatus 1. For example, the control module 13 receives four touching position data, as illustrated in FIG. 2B, in which the Y coordinate of respective touching positions 211-231 is closer to and higher than the Y coordinate of another touching position 241. As such, within a predetermined area in accordance with the Y coordinate of touching position 241, the control module 13 can distinguish user's holding pattern as illustrated in FIG. 2A. Hence, even if the absolute position of the touching area in FIGS. 2C to 2E are all variant from the absolute positions as shown in FIG. 2B, the control module 13 receives the two-dimensional position data as illustrated in FIG. 2B and FIG. 2E. Accordingly, the similar holding pattern can be identified based on the relative positions.

Figure 3A:
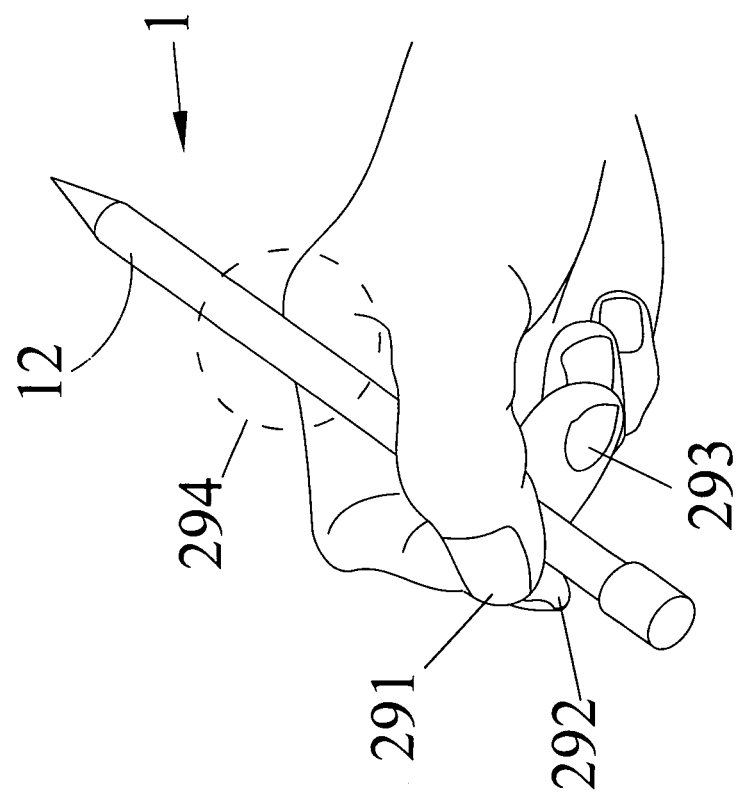
FIG. 3A is a diagram illustrating an example of input mode in accordance with one embodiment of the present invention.
Figure 3B:
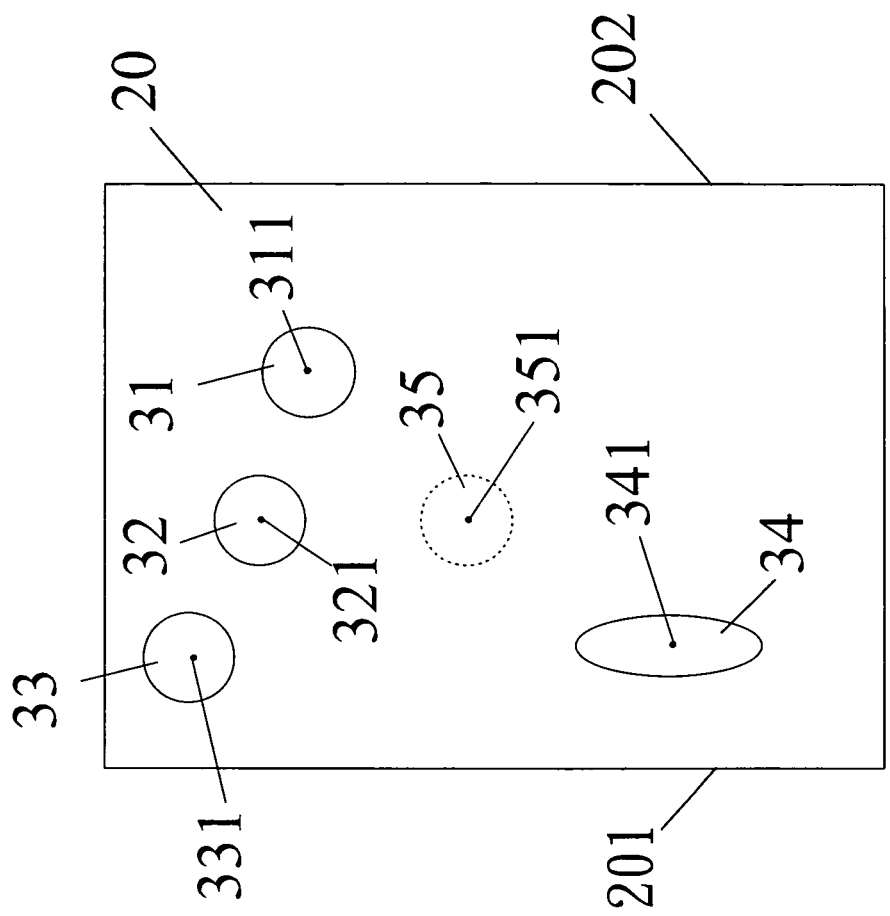
FIG. 3B is a block diagram illustrating a combination of different two-dimensional position data detected by an arc surface touching module in accordance with one embodiment of the present invention.
Figure 3C:
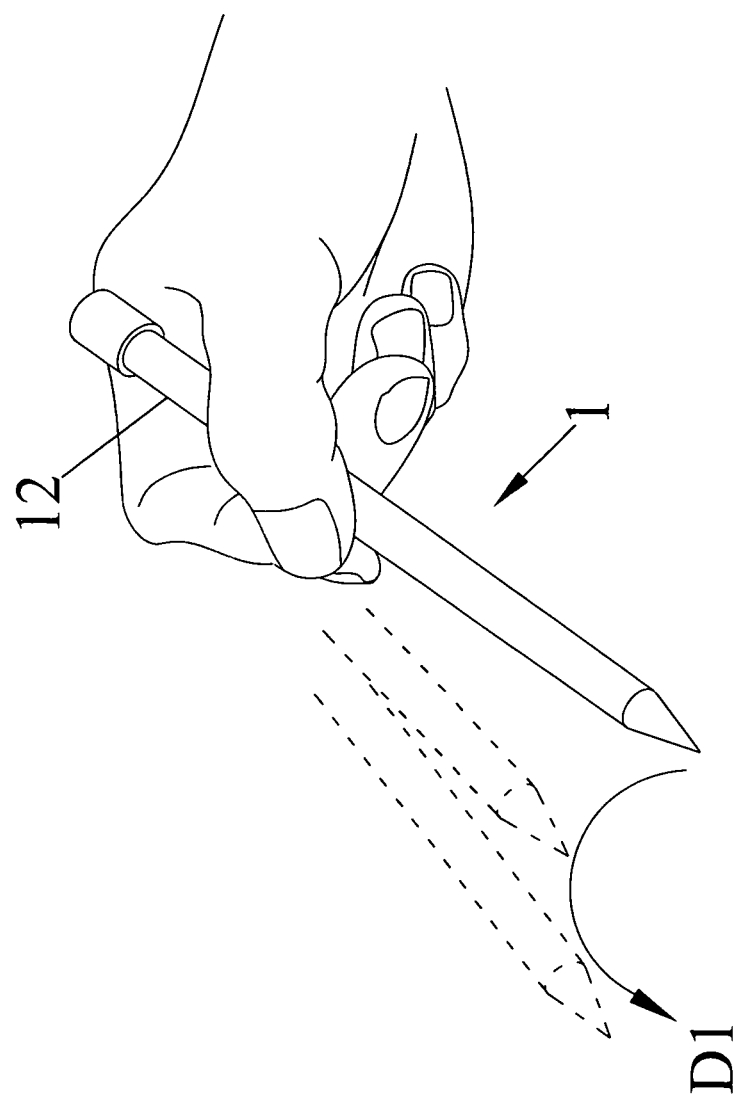
FIG. 3C illustrates an operation of a columnar input device in accordance with the present invention.

FIGS. 3A-C illustrate alternative examples of holding patterns relating to input modes of the input apparatus in accordance with one embodiment of the present invention. The diagram shows receiving combination of two-dimensional position data of the arc surface touching module wherein a user holds the input apparatus 1 reversely, i.e. holds the rear end of the input apparatus 1. In one example, an instruction identification module determines whether or not a user holds a front end of the columnar input device 1 according to the two-dimensional position produced by the cambered touch control module 12.

Referring back to FIG. 3B, the thumb 291 touches the area 31 on the top of the plane 20, while the index finger 292 touches the area 32 on the top of the plane 20. The middle finger 293 touches the area 33 on the top of the plane 20, and a part of the hand between the thumb and the index finger 292 touches the area 34 on the top of the plane 20. The arc surface touching module 12 senses and inputs a two-dimensional position data 311, a two-dimensional position data 321, a two-dimensional position data 331 and a two-dimensional position data 341. In FIG. 3B, Y coordinate of respective two-dimensional positions 311-331 are closer to and lower than the two-dimensional position 341. In FIG. 3B, Y coordinate of respective two-dimensional positions 311-331 are closer to and lower than the two-dimensional position 341.

In another embodiment, if a sensor such as a gravity sensor of the columnar input device 1 detects that a user holds the columnar input device 1 in an opposite direction, the instruction identification module can produce an operation instruction for holding the columnar input device 1 in a direction other than the regular holding method. If the columnar input device 1 is held in an opposite direction, the columnar input device becomes a rubber eraser, and the user can move the columnar input device 1 to erase words.

In FIG. 3C, the instruction identification module similarly determines whether or not the user holds a rear end of the columnar input device 1 or the input apparatus 1 according to the two-dimensional position produced by the cambered touch control module 12. If the user holds the front end of the columnar input device 1, another sensor such as a gyroscope or a direction detector may be installed for detecting the moving direction of a pointed end of the columnar input device 1. As such, the instruction identification module generates an instruction for moving a cursor, and thus the user can hold the front end of the columnar input device 1 to control the cursor on the screen of the electronic apparatus 19.

If the user holds the rear end of the columnar input device 1, then the instruction identification module can be used for identifying a user's predetermined operating movement according to a physical quantity detected by another sensor to generate a corresponding operation instruction as shown in FIG. 2C. If the user holds the rear end of the columnar input device 1, it performs an operating movement with an arc displacement along the direction D1 at the rear end. The instruction identification module becomes larger first and then smaller according to a continuous physical quantity detected by a sensor, such as an acceleration detected by the acceleration detector. The direction detector can detect a displacement of the columnar input device 1 that moves from the upper right position to the lower left position, and the instruction identification module can determine whether or not a user makes an arc movement towards the left side to generate a corresponding operation instruction. For example, drawing an arc towards the left side gives an instruction for scrolling to the next page, and drawing an arc towards the right side gives an instruction for scrolling to the previous page.

The aforementioned instruction, if needed, may include an instruction of adjusting a sound volume, an instruction of adjusting a screen parameter (such as brightness, rotation or size of a displayed area), a multimedia playback instruction or a document browsing instruction. The operating movement, if needed, may include a pen holding movement, a pen gripping movement, and a pen rotating movement, etc. Any operating movement determined by analyzing a signal of a touch control module or sensor is intended to be covered by the patent claim of the present invention.

Figure 4A:
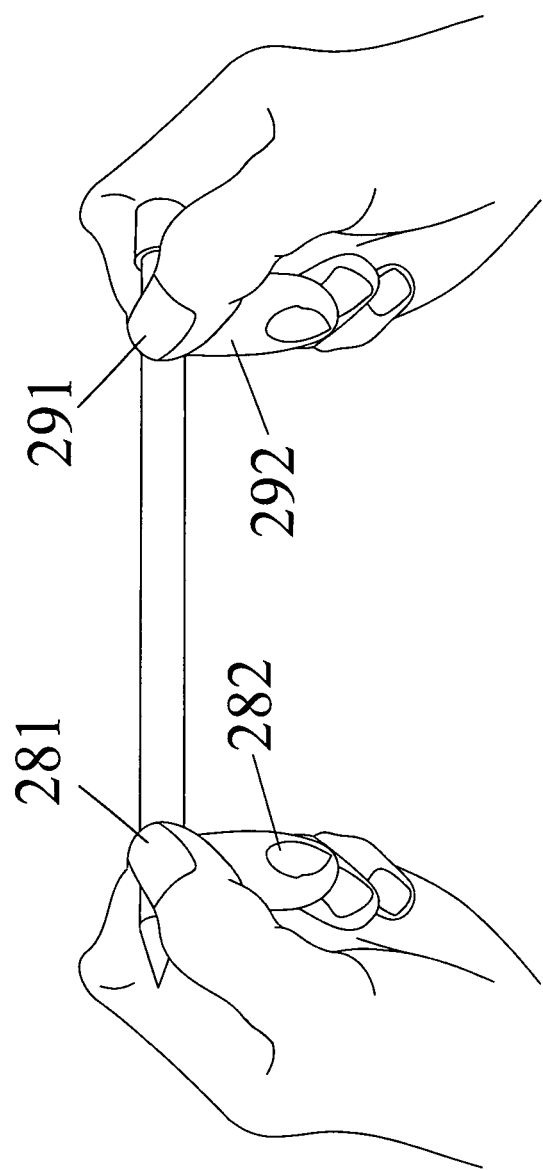
FIG. 4A is a diagram illustrating another example of input mode in accordance with one embodiment of the present invention.
Figure 4B:
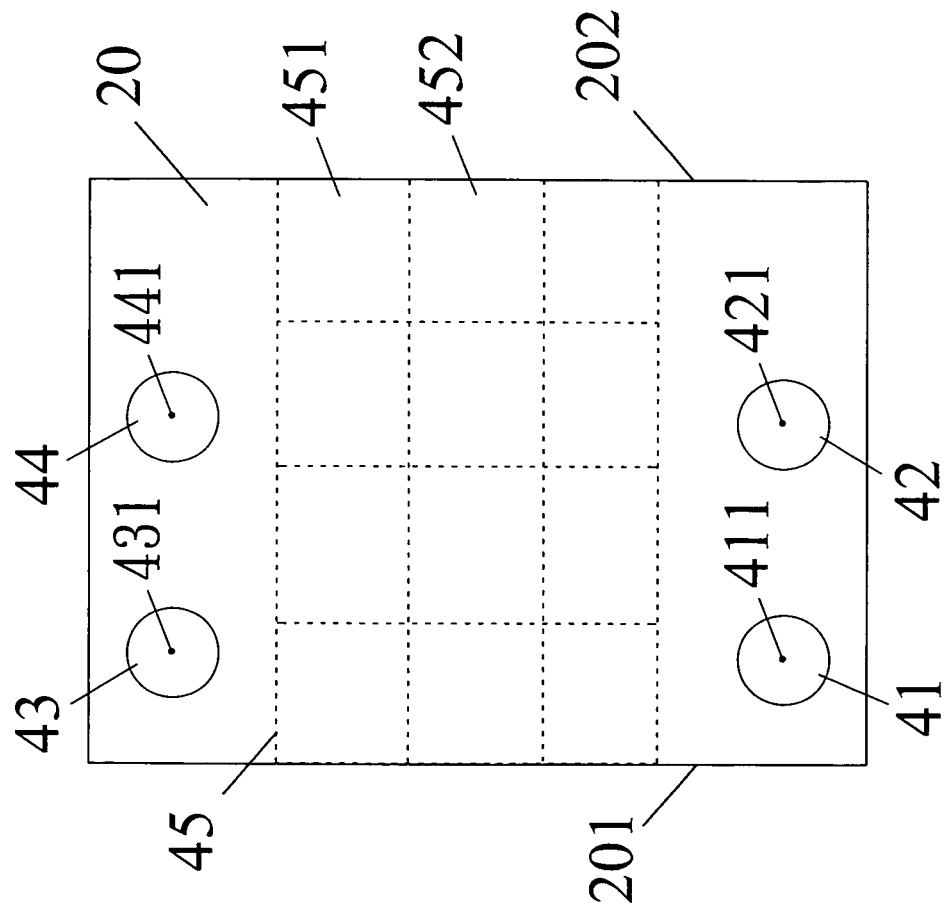
FIG. 4B is a diagram illustrating a combination of assorted two-dimensional position data received by an arc surface touching module in accordance with one embodiment of the present invention.

FIGS. 4A-B illustrate an alternative holding pattern for an input mode of the input apparatus in accordance with one embodiment of the present invention. FIG. 4B shows the receiving combination of two-dimensional position data of the arc surface touching module 12 wherein user's hands hold both ends of the input apparatus 1. The thumb 281 and index finger 282 of the left hand hold the frond end of the input apparatus 1, and the thumb 291 and index finger 292 of the right hand hold the rear end of the input apparatus 1. The touching areas of 43 and 44 are shown on the top of plane 20. In FIG. 4B, the arc surface touching module 12 allows the user to input a two-dimensional position data 411, a two-dimensional position data 421, a two-dimensional position data 431 and a two-dimensional position data 441. Since the combination of two-dimensional includes two distinctive groups of two-dimensional positions, the Y coordinates of these groups are respectively the minimum and maximum values, which are significantly different from the combination of two-dimensional position data illustrated in FIGS. 2B-2E and 3B.

The control module 13 can distinguish the holding pattern of the input apparatus 1 based on the two-dimensional position data 121 input from arc surface touching module. When the control module 13 can distinguish the holding pattern of the input apparatus 1 based on the two-dimensional position data 121, the input apparatus 1 is subsequently switched to the corresponding input mode. The control module 13 subsequently generates a control signal based on two-dimensional position data 121 inputted from arc surface touching module.

Upon identifying a holding position held by the upright holding pattern as shown in FIG. 2A, the control module 13 switches the input apparatus 1 into browsing mode. When the index finger 292 touches area 22 twice, the arc surface touching module 12 inputs two consecutive two-dimensional position data 221 in the control module 13. The control module 13 detects two touches in the area 22 and generates a control signal for a command of the "next page" provided that the control module 13 receives two consecutive two-dimensional position data 251. Similarly, a user bends the index finger 292 to touch area 25 twice, and subsequently, generates a control signal for a command of "previous page".

Similarly, upon identifying the input apparatus 1, which is held by a reverse holding pattern as shown in FIG. 3A, the control module 13 switches the input apparatus 1 to a multimedia broadcasting mode. When the control module 13 receives two consecutive two-dimensional position data 321, it distinguishes that user bends the index finger 292 to touch area 32 twice, and generates a control signal for a command of "broadcast". If the control module 13 receives two consecutive two-dimensional position data 351, it distinguishes that the user bends index finger 292 to touch area 35 twice and a control signal for a command of "pause" is generated. If the control module 13 receives a two-dimensional position data for a movement from the area 32 to the area 35, it distinguishes that the user slides his/her index finger 292 from the area 32 towards the area 35 and a control signal for a command of "fast forward" is generated. On the contrary, if the control module 13 distinguishes that the user slides his/her index finger 292 from the area 35 towards the area 32, a control signal for a command of "fast backward" is then generated.

In another embodiment, upon identifying the input apparatus 1, which is held by the two-handed holding pattern as illustrated in FIG. 4A, the control module 13 switches the input apparatus 1 to a keyboard mode. When the control module 13 receives two-dimensional position data from the area 45, it generates the control signal for command of an "input character", thereby the input character changes based on the touched area. The area 45 is a numerical keyboard, wherein the area 451 can receive digit 3 input while the area 452 can receive digit 2 inputs.

It should be noted that the holding pattern of the input apparatus described above is with reference to the present embodiments, any methods which can distinguish the holding pattern of input apparatus through two-dimensional position data 121, are encompassed within the scope of the present embodiment of the invention.

Figure 5A:
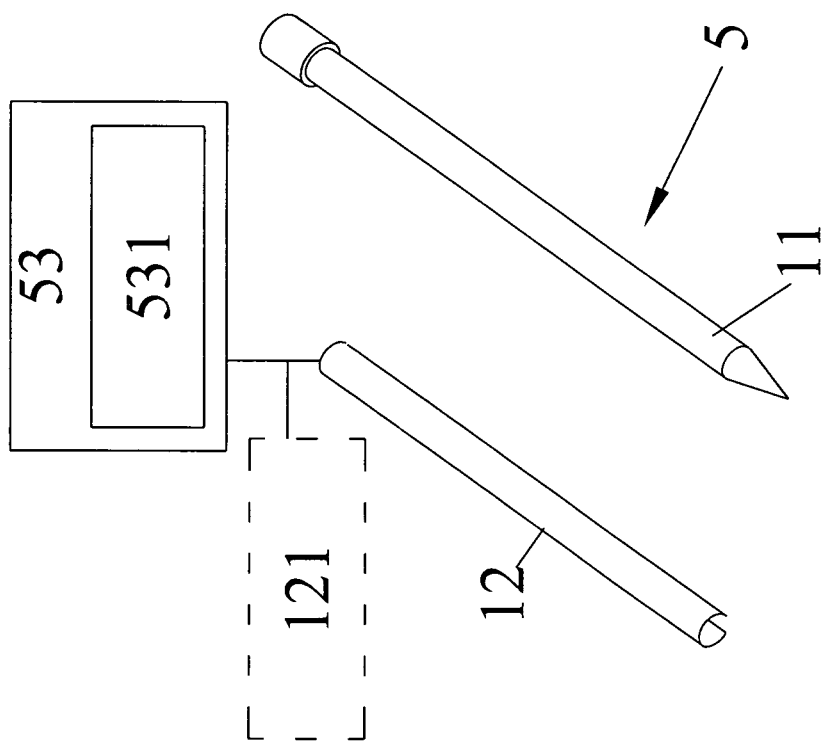
FIG. 5A is a block diagram illustrating an alternative example of an input apparatus with multi-mode switching function in accordance with one embodiment of the present invention.

FIG. 5A shows a schematic diagram illustrating an input apparatus capable of performing multi-mode switching functions in accordance with another embodiment of the present invention. The input apparatus 5 includes a body 11, an arc surface touching module 12 and a control module 53. In this embodiment, the body 11 is a pipe-shaped object with cylindrical surface. Alternatively, the body 11 can be a cylinder, a cone, a sphere or any geometric object with an arc surface. The arc surface touching module 12 is arranged on or wrapped over the surface of the body 11 for detecting and/or inputting a two-dimensional position data 121. The arc surface touching module 12 is preferably a flexible touching panel. The control module 53 is operable to transform the two-dimensional position data 121 into a three-dimensional position data 531, and subsequently switches the input mode of the input apparatus 5 based on the three-dimensional position data 531.

Figure 5B:
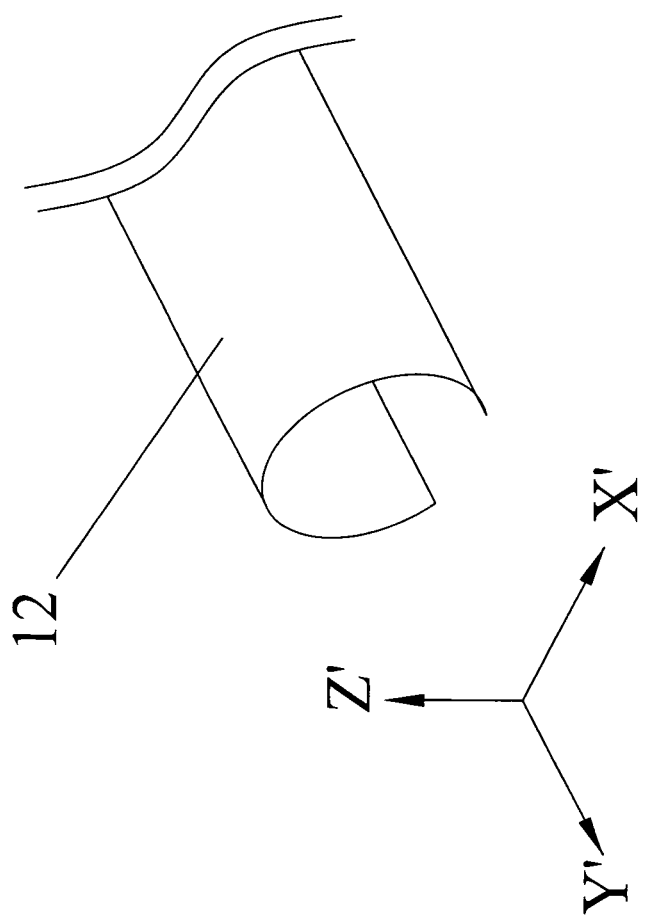
FIG. 5B illustrates transforming a two-dimensional coordinate into a three-dimensional coordinate of the arc surface touching module in accordance with one embodiment of the present invention.
Figure 5C:
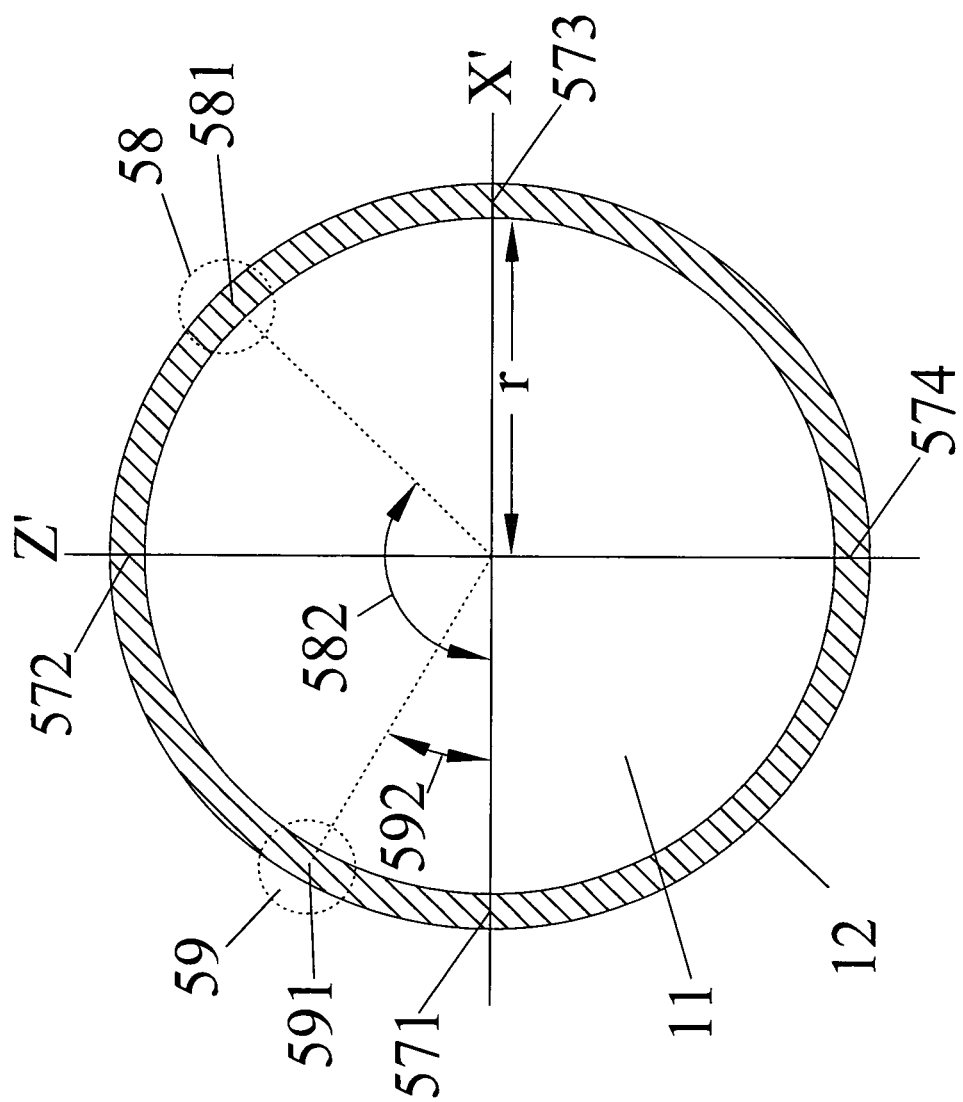
FIG. 5C illustrates a schematic diagram of transforming X-axis coordinate into X'-Z' coordinate in accordance with one embodiment of the present invention.

FIG. 5B-C illustrate schematic diagrams of two-dimensional and three-dimensional coordinates of arc surface touching module in accordance with one embodiment of the present invention. The schematic diagram transforms X-axis coordinate into X'-Z' coordinate as shown in FIG. 5B. The arc surface touching module 12, in one example, is not connected underneath as shown in FIG. 5B. Alternatively, when the arc surface touching module 12 is arranged on surface of the body 11, both sides of edge are coupled to form a cylindrical object.

According to the geometric characteristics of the cylinder, the Y-axis coordinate of the three dimensions is parallel to the Y-axis coordinate of the two dimensions, as the Y-axis illustrated in FIG. 2B. The X' axis coordinate and Z' axis coordinate are derived from the transformation of the X-axis coordinate of the two dimensions of the arc surface touching module 12, as the X-axis illustrated in FIG. 2B. In FIG. 5C, the arc surface touching module 12, for example, entirely wraps the body 11 (the cylinder). The X-axis coordinate of the arc surface touching module 12 is divided quarterly, which corresponds to zero degree, ninety degrees, one hundred and eighty degrees, and two hundred and seventy degrees, respectively.

If the maximum X coordinate of the arc surface touching module 12 is 512 pixels, the radius of the body, for example, is 256 divided by $\pi$ ($\pi$ is the ratio of the circumference of a circle to its diameter), the position of the zero$^{th}$ pixel of X coordinate is transformed into the position 571 of the X'-Z' coordinate, the position of the one hundred and two-eighth pixel of X coordinate is transformed into the position 572 of the X'-Z' coordinate, the position of the two hundred and fifty-sixth pixel of X coordinate is transformed into the position 573 of the X'-Z' coordinate, the position of the three hundred and eighty-fourth pixel of X coordinate is transformed into the position 574 of the X'-Z' coordinate.

When pixel of the arc surface touching module is distributed linearly, the angle position of the X'-Z' coordinate can be calculated based on X coordinate, for example the X coordinate of position 59 is forty-three pixels which is one third distance from the position 571 to position 572, thus the angle 592 of the position 59 is thirty degrees (90/3=30), so as to figure out the X' coordinate of position 59 is r×cos 30°, and Z' coordinate is r×sin 30°. By the same token, if the X coordinate of position 58 is one hundred and ninety-two pixels, thus angle 582 of the position 58 is one hundred and thirty-five degrees (192/256=3/4, 180×3/4=135), so as to figure out the X' coordinate of position 58 is r×cos 135°, and Z' coordinate is r×sin 135°. From the explanation above, by analyzing the geometric characteristics of the body being wrapped by arc surface touching module 12, a two-dimensional coordinates then can be transformed into a three-dimensional coordinates.

Figure 6A:
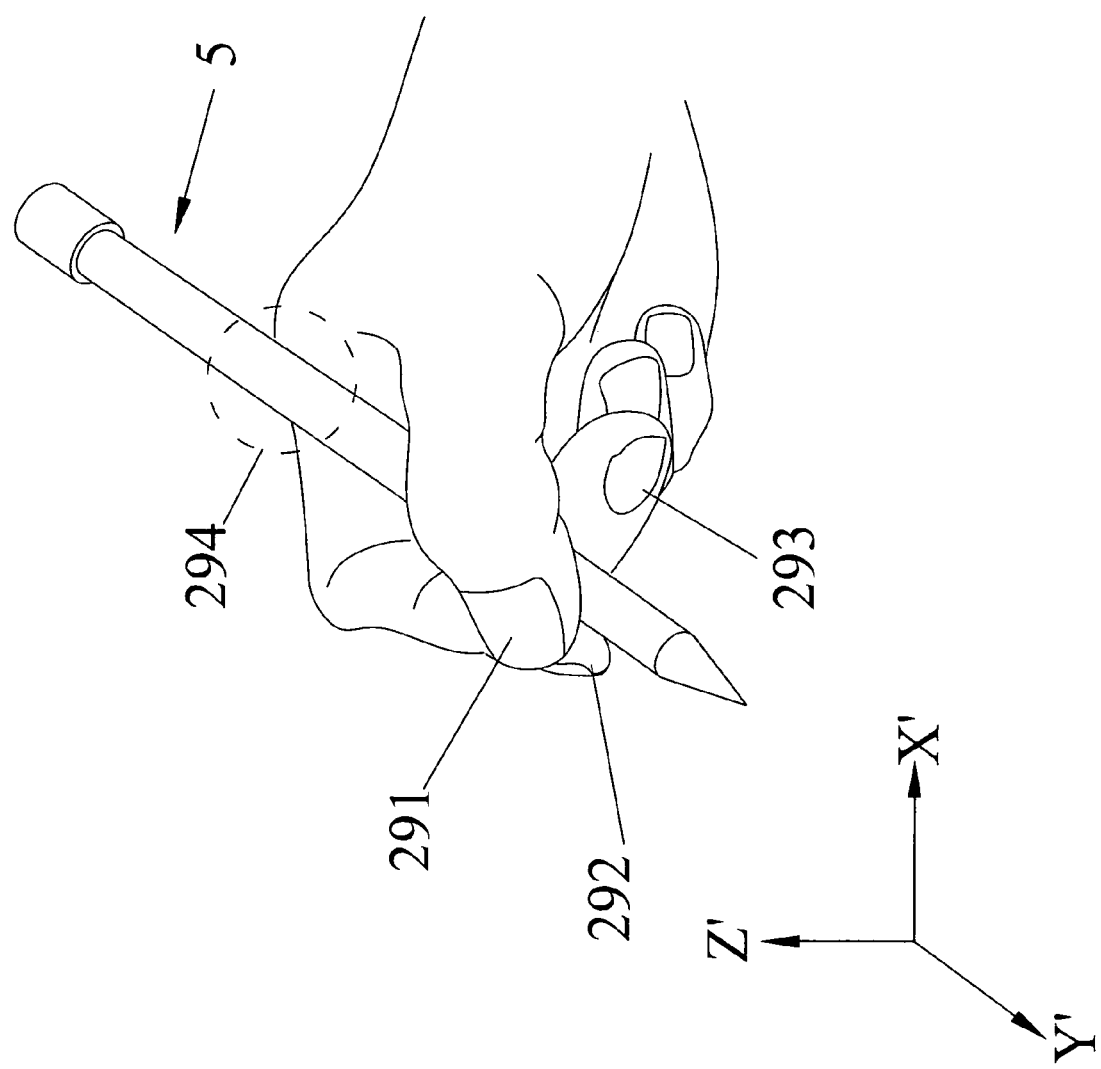
FIG. 6A illustrates an example of an input apparatus with multi-mode switching function in accordance with one embodiment of the present invention.

By transforming two-dimensional coordinates into three-dimensional coordinates, more messages for distinguishing the holding pattern of the input apparatus 11 can be generated. For example, the position 294 is closer to the part of the hand between the thumb and the index finger. Thus, the position 294 is at the downward side of the input apparatus 5, i.e., Z' coordinate is negative value. The Y' axis is the parallel input apparatus as illustrated in FIG. 6A. But the user often neglects the axial direction of the input apparatus during operation. In order to increase the operational convenience of the input apparatus 5, the control module then can adjust the axial direction based on the touched area by users.

As an example of the upright holding pattern of the input apparatus, the control module 53 transforms the two-dimensional coordinates into three-dimensional coordinates of the positions 291-294, and uses the three-dimensional coordinates to distinguish upright holding position. The principle to distinguish is similar to the principle of using two-dimensional position data. As such, the unnecessary detail thereof is omitted. The control module 53 stands on the characteristic of the position 294 positioned at the downward side of the input apparatus 1 and uses the three-dimensional coordinates of the position 294 to adjust the parameters being used during the transforming process as described above. The transformation of three-dimensional coordinates then confirms the holding status of the input apparatus 1.

Figure 6B:
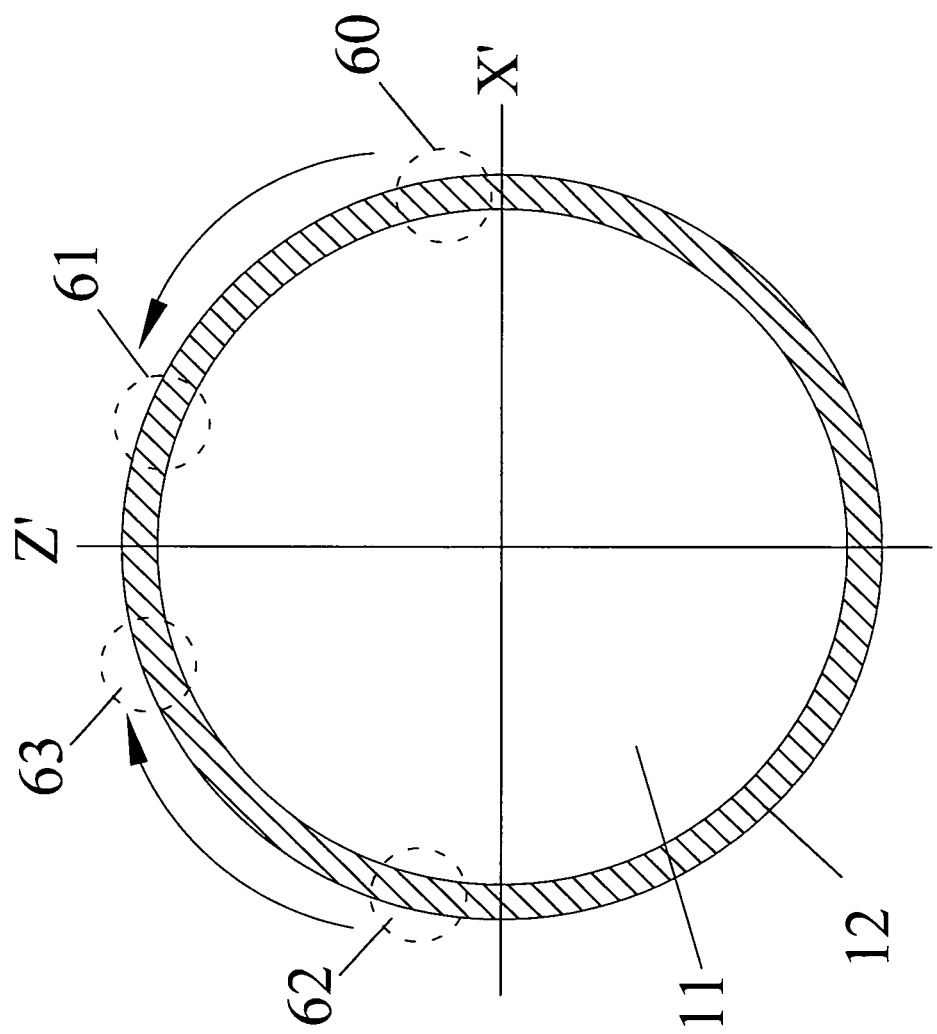
FIG. 6B illustrates an operational schematic diagram of an input apparatus with multi-mode switching function in three-dimensional coordinates in accordance with one embodiment of the present invention.

Subsequently, the control module 53 generates a control signal based on three-dimensional position data 531 and switches input modes. The direction of the touching movement can be identified by transforming two-dimensional position data into three-dimensional position data. FIG. 6A-B shows an operational schematic diagram illustrating an input apparatus in accordance with one embodiment of the present invention. After the three-dimensional transformation, the movement of the position 60 towards position 61 and the position 62 towards position 63 are performed. Since both are moving upward directions, the control module 53 can generate the corresponding control signals accordingly. If not transformed through three-dimensional coordinates, the movement of the position 60 towards position 61 and the position 62 towards position 63 may be activated. Since both are moving in different directions, the control module 53 is accustomed to generate erroneous control signals.

Figure 7A:
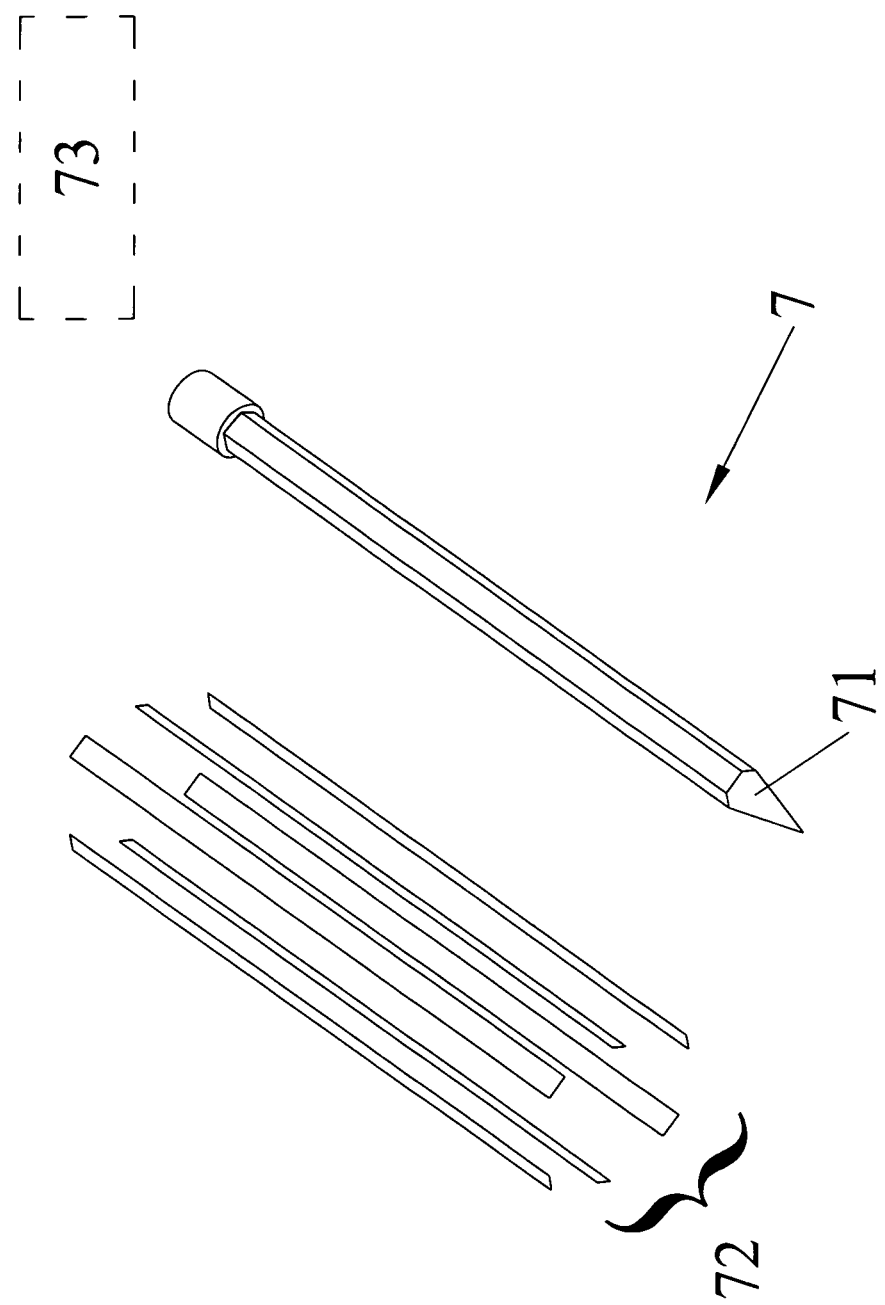
FIGS. 7A-C illustrate another example of a columnar input device in accordance with one embodiment of the present invention.
Figure 7B:
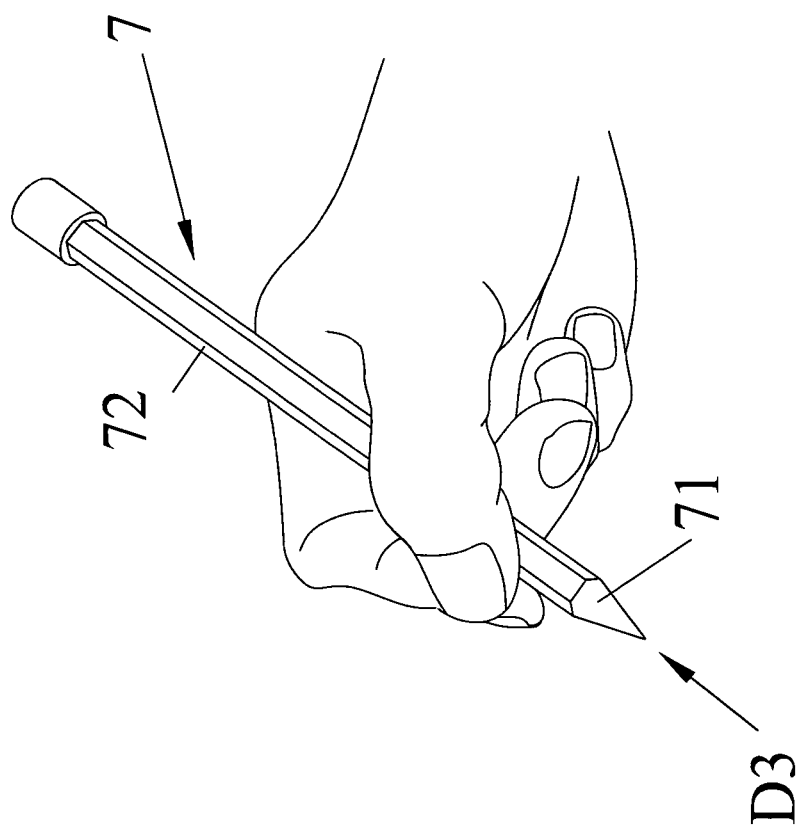
Figure 7C:
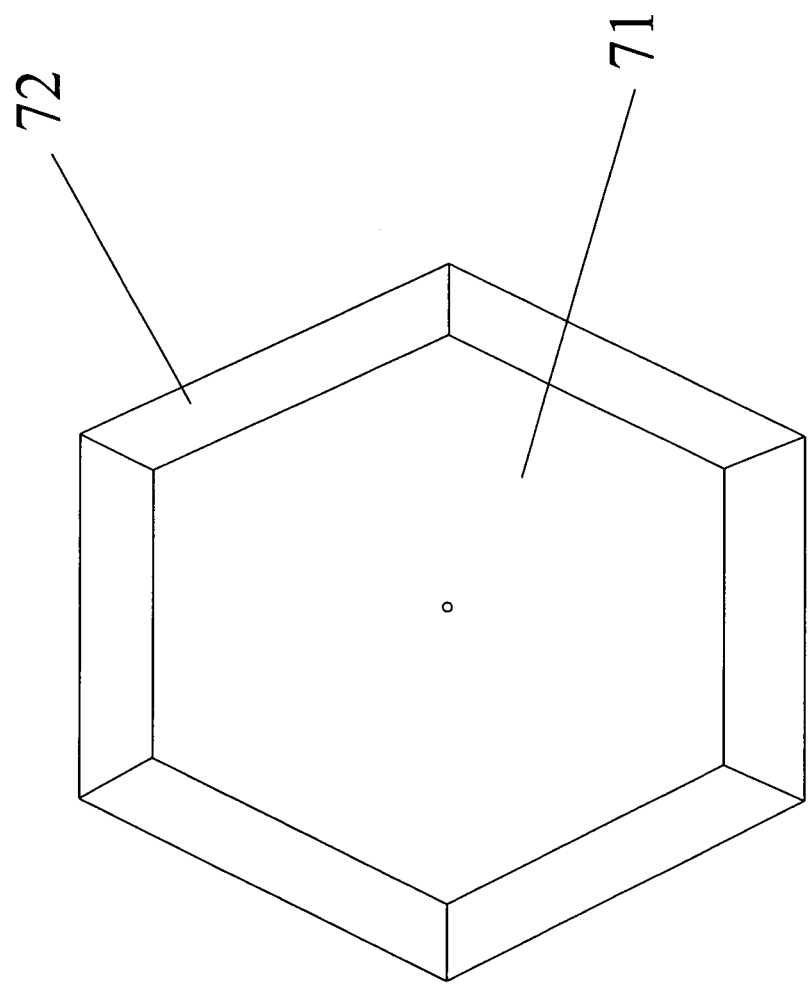

FIGS. 7A-C illustrate schematic views of a columnar input device 7, a schematic view of its operations, and a front view of the columnar input device viewing from a direction of D3 in accordance with one embodiment of the present invention. The columnar input device 7 includes a columnar body 71, a plurality of touch control modules 72 and a signal transmission module 73. The columnar body 71 has a plurality of facing directions, and a plurality of touch control modules 72 installed in each facing direction of the columnar body respectively. In this embodiment, the columnar body 71 as shown in FIG. 7A is a hexagonal column with six facing directions, and the touch control modules 72 are installed on the six facing directions of the hexagonal column respectively as shown in FIG. 7C. It is noteworthy that the hexagonal column is used for illustrating the embodiment(s) of the present invention only, but not intended to limit the scope of the invention. Any columnar input device having a plurality of touch control modules installed on a plurality of different planes of the columnar body such as a tetrahedral column or a triangular column is intended to be covered by the patent claim of the invention.

The touch control modules 72 are provided for inputting a two-dimensional data, and these two-dimensional data are integrated into a two-dimensional data of the same plane, and a signal based on the integrated two-dimensional data is transmitted to the electronic apparatus through the signal transmission module 73. Since the two-dimensional data of different touch control modules 72 are integrated, the data processing procedure is similar to the columnar input device as shown in the FIG. 1A.

The columnar input device 7, if needed, may further include a sensor for detecting a physical quantity of the columnar input device 7, and the sensor preferably includes an acceleration sensor, a gravity sensor, a gyroscope or a digital compass for detecting acceleration, an inclination angle, a rotation angle or a facing direction of the columnar input device 7. A signal based on the two-dimensional data or a physical quantity detected by a sensor is used for generating an operation instruction through an instruction identification module to provide users a more complicated and diversified operation method. The instruction identification modules can be installed on the columnar body 71 or the electronic apparatus. The aforementioned signal transmission module 73 is a wireless signal transmission module, such as a Bluetooth transmission module, a radio frequency transmission module, an infrared transmission module, or a cable signal transmission module, like a USB transmission module or an IEEE1394 module.

Further, the columnar input device of the invention, if needed, may install a trigger element, such as a press key or a photo interrupt element, to provide a trigger signal to the instruction identification module in order to generate an instruction. If the touch control module does not receive an inputted data for a period of time, the sensor will be switched to an idle state for power saving.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An input apparatus with multi-mode switching function, comprising:
    a body for holding;
    an arc surface touching module, arranged on surface of said body and fully surrounding a side surface of said body, capable of detecting two-dimensional position data via at least one contact; and
    a control module, coupled to said body, capable of switching said input apparatus to a first input mode based on said two-dimensional position data, and generating a control signal based on said first input mode and said two-dimensional position data, wherein said arc surface touching module provides a continuous touching surface, which can be bent and conform to a surface of said body held by hand and said input mode can be automatically launched and further at least an operation command can be input, wherein said surface of said body held by hand has a circular symmetric surface with respect to a longitudinal central line of said body, and said arc surface touching module is disposed on said circular symmetric surface, wherein a holding pattern of a user's hand remains without change when said body is under rotation shift with respect to said longitudinal central line.

2. The input apparatus of claim 1, wherein said body is configured to have a geometric shape of one of a cylindrical column, a cylinder, a cone, a sphere, and a circular column.

3. The input apparatus of claim 1, wherein said control module determines said holding pattern of said user's hand based on said two-dimensional position data; and is further capable of switching said input apparatus to one of a plurality of input modes corresponding to said holding pattern.

4. The input apparatus of claim 3, wherein said input apparatus is a pipe-shaped input apparatus, and wherein said holding pattern further includes one of an upright hold, a reverse hold, an upright grasp, a reverse grasp, a two-handed hold and a brush hold.

5. The input apparatus of claim 1, wherein said control module switches said first input mode of said input apparatus based on the relative relationship of said two-dimensional position data.

6. An input apparatus with multi-mode switching function, comprising:
- a body;
- an arc surface touching module, arranged on the surface of said body and fully surrounding a side surface of said body, for inputting a two-dimensional position data; and
- a control module, coupled to said body, for transforming said two-dimensional position data into three-dimensional position data based on geometric characteristics of said body, and switching to an input mode of said apparatus based on said three-dimensional position data, wherein said control module is capable of generating a control signal based on said switched input mode and said three-dimensional position data, wherein said arc surface touching module provides a continuous touching surface, which can be bent and conform to a surface of said body held by hand and said switched input mode can be automatically launched and further at least an operation command can be input, wherein said surface of said body held by hand has a circular symmetric surface with respect to a longitudinal central line of said body, and said arc surface touching module is disposed on said circular symmetric surface, wherein a holding pattern of a user's hand remains without change when said body is under rotation shift with respect to said longitudinal central line.

7. The input apparatus of claim 6, wherein said body is in the geometric shape of a cylinder, a cone, a sphere or any arc surface objects.

8. The input apparatus of claim 6, wherein said control module determines said holding pattern of said user based on said three-dimensional position data, wherein said control module switches said input apparatus to an input mode in response to said holding pattern.

9. The input apparatus of claim 8, wherein said input apparatus is a pipe-shaped input apparatus; and wherein the holding pattern includes upright hold, reverse hold, upright grasp, reverse grasp, two-handed hold, or brush hold.

10. The input apparatus of claim 6, wherein said control module switches the input mode of said input apparatus based on the relative relationship of said three-dimensional position data.

11. A columnar input device for controlling an electronic apparatus, comprising:
- a columnar body;
- a cambered touch control module, installed on said columnar body and fully surrounding a side surface of said columnar body, for inputting a two-dimensional data;
- a signal transmission module, for transmitting a signal based on said two-dimensional data to said electronic apparatus; and
- a sensor for detecting a physical quantity of said columnar input device, wherein said cambered touch control module provides a continuous touching surface, which can be bent and conform to a surface of said columnar body held by hand and a switched input mode can be automatically launched and further at least an operation command can be input, wherein said surface of said columnar body held by hand is a circular symmetric surface with respect to a longitudinal central line of said columnar body, and said cambered touch control module is disposed on said circular symmetric surface wherein a holding pattern of a user's hand remains without change when said columnar body is under rotation shift with respect to said longitudinal central line.

12. The columnar input device of claim 11, further comprising an instruction identification module for generating an operation instruction based on said two-dimensional data and said physical quantity, and for transmitting said operation instruction to said electronic apparatus through said signal transmission module.

13. The columnar input device of claim 12, wherein said instruction identification module identifies a user's operating movement in accordance with said two-dimensional data and said physical quantity, and to generate said operation instruction corresponding to said operating movement.

14. The columnar input device of claim 12, wherein said sensor is one of an acceleration sensor, a gravity sensor, a gyroscope, and a direction detector.

15. An electronic system having a portable input device, comprising:
- a system capable of processing information; and
- a remote input device as a columnar structure to be held by a user's hand coupled to said system and capable of providing commands to the system in accordance with user's instructions via a wireless communications network, wherein the remote input device provides a continuous touching surface, fully surrounding a side surface of said columnar structure, is capable of decoding said user's instructions by sensing two-dimensional contact locations between the user's hand and a surface of the remote input device, wherein an input mode can be automatically launched and further at least an operation command can be input, wherein said columnar structure of said remote input device is a circular symmetric surface with respect to a longitudinal central line of said remote input device and provides as said continuous touching surface, wherein a holding pattern of the user's hand remains without change when said columnar structure is under rotation shift with respect to said longitudinal central line.

16. The system of claim 15, wherein said system is one of a personal digital assistant ("PDA"), a cellular phone and a smart phone.

17. The system of claim 15, wherein said remote input device is a stylus with a touch sensitive surface.

18. The system of claim 17, wherein said stylus and said touch sensitive surface are two independent elements.

19. The system of claim 17, wherein said stylus and said touch sensitive surface are fabricated on a single structure.

20. The system of claim 15, wherein said remote input device includes at least one of an acceleration sensor, a gravity sensor, a gyroscope sensor, and a digital compass.

* * * * *